No. 629,122. Patented July 18, 1899.
C. A. DAVIS.
SOLAR WATER HEATER.
(Application filed Mar. 20, 1899.)
(No Model.) 2 Sheets—Sheet 1.
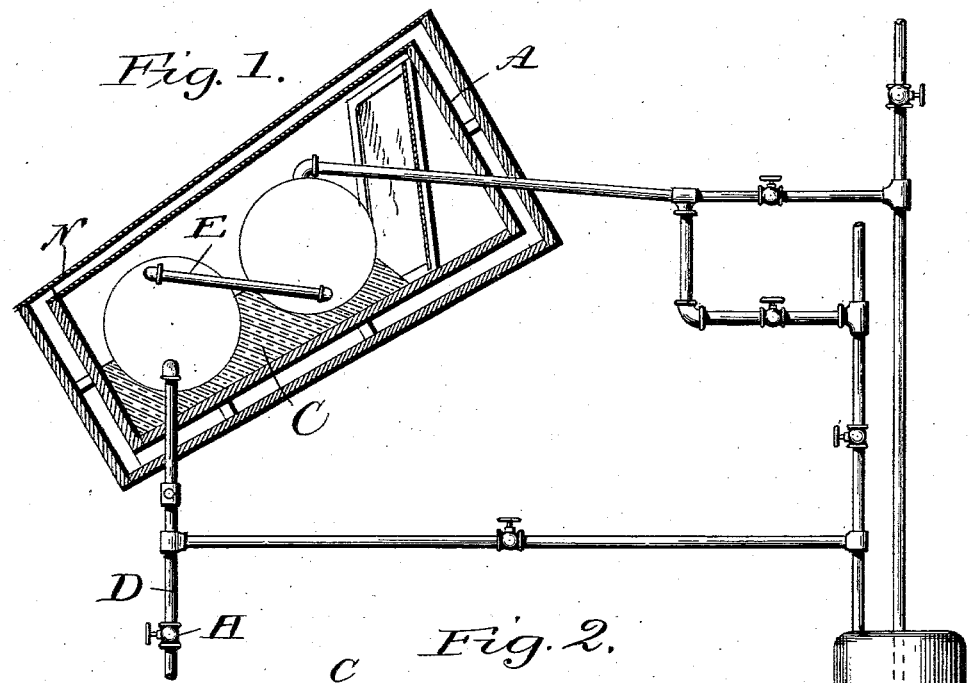
Fig. 1.
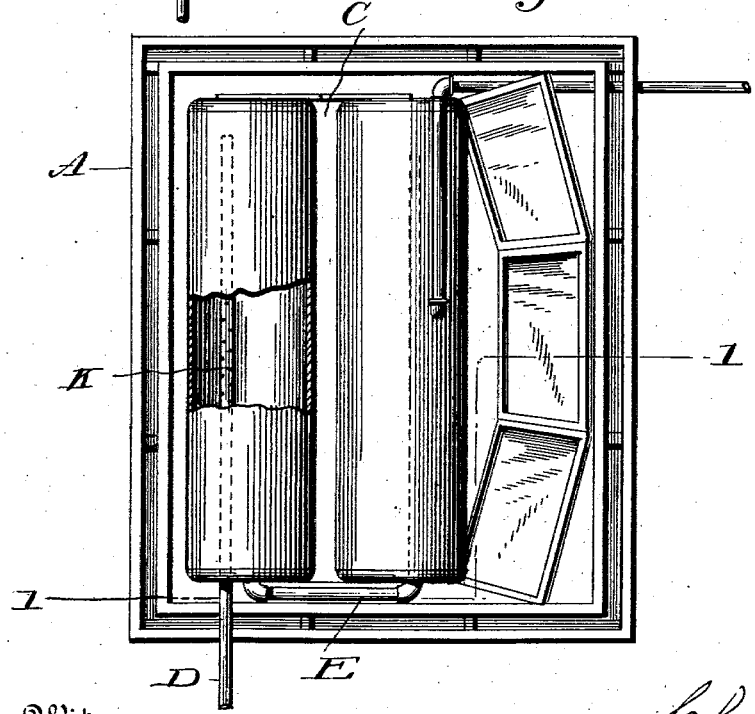
Fig. 2.
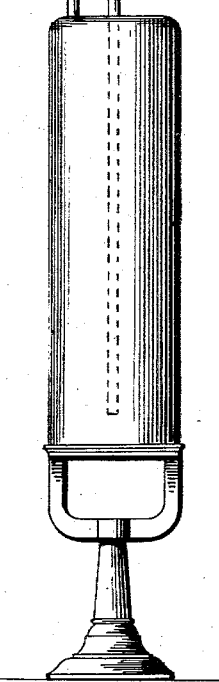
Witnesses
L. C. Hills
A. L. Hoyt
Inventor
Chas. A. Davis,
By Franklin N. Hough
Attorney No. 629,122. Patented July 18, 1899.
C. A. DAVIS.
SOLAR WATER HEATER.
(Application filed Mar. 20, 1899.)
(No Model.) 2 Sheets—Sheet 2.
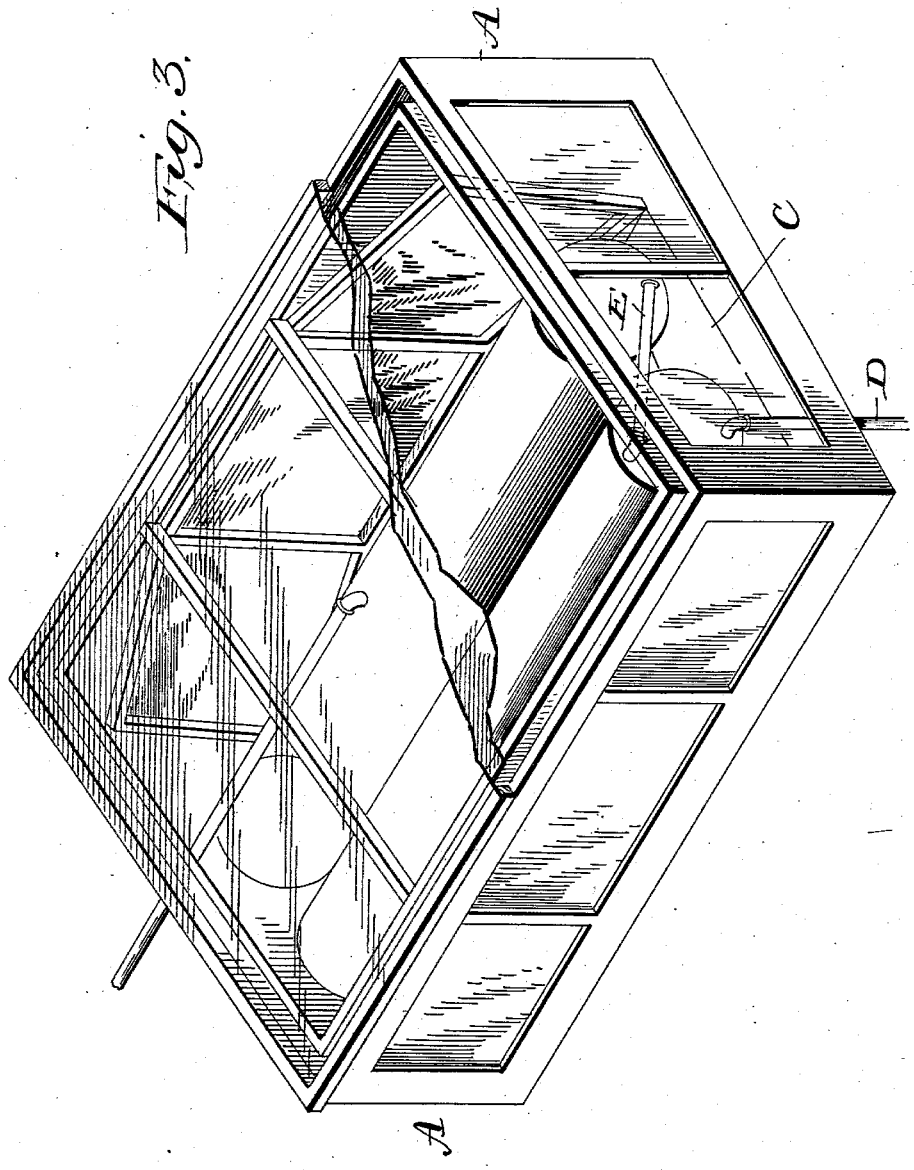

UNITED STATES PATENT OFFICE.

CHARLES A. DAVIS, OF PASADENA, CALIFORNIA.

SOLAR WATER-HEATER.

SPECIFICATION forming part of Letters Patent No. 629,122, dated July 18, 1899.

Application filed March 20, 1899. Serial No. 709,782. (No model.)

*To all whom it may concern:*

Be it known that I, CHARLES A. DAVIS, a citizen of the United States, residing at Pasadena, in the county of Los Angeles and State of California, have invented certain new and useful Improvements in Solar Water-Heaters; and I do declare the following to be a full, clear, and exact description of the invention, such as will enable others skilled in the art to which it appertains to make and use the same, reference being had to the accompanying drawings, and to the letters of reference marked thereon, which form part of this specification.

This invention relates to certain new and useful improvements in solar heaters; and it relates more specifically to the provision of an apparatus of this character which is designed especially for heating water; and to this end the invention consists in the provision of receptacles contained within a suitable inclosure and preferably surrounded by a heat-retaining material—such, for instance, as sawdust—and one of the inner walls of the receptacle being provided with a series of reflectors arranged upon the arc of a circle, whereby the rays of the sun may be reflected at all hours, a glass cover to the receptacle being provided through which the rays pass to the reflectors.

The invention has for its further object the provision of means for equally distributing the cold water as it enters the receptacle, and also in the means provided for preventing any backflow after the water enters the receptacle to be acted upon by the rays of the sun.

The invention is clearly illustrated in the accompanying drawings, which, with the letters of reference marked thereon, form a part of this specification, and in which—

Figure 1 is a sectional view taken through the heater. Fig. 2 is a plan view with the top or cover removed in order to better illustrate the construction contained within the casing. Fig. 3 is a perspective view of the heater, a portion being shown as broken away.

Reference now being had to the details of the drawings by letter, A designates the casing, which may be of any suitable material. The front edge of the casing is somewhat shorter than the rear edge, as shown.

Contained within the casing are water-receptacles B, which may be of any suitable or desired size or number, which receptacles I have shown in the drawings as of cylindrical form, and they are designed, preferably, to be embedded in a suitable heat-retaining material, as sawdust or its equivalent, (represented by the letter C.) It is my purpose to partially surround the receptacles with this heat-retaining material, leaving the face of the receptacle adjacent to the reflectors free from the material in order that the reflected heat will not lose its energy until it reaches the wall of the receptacle containing the water to be heated.

D designates the inlet-pipe, which enters the outer side of the two cylindrical receptacles near its lower end, as shown, and leading from the upper end of the same receptacle is the upper end of the pipe E, which communicates between the two cylindrical receptacles, the lower end of the said connecting-pipe entering the second receptacle at a point near its lower end and serves as a means for causing the heated water to pass from the first to the second receptacle. This supply-pipe extends into the second receptacle and is perforated in the first receptacle, distributing the water at the bottom, as shown. Leading from the upper portion of the second receptacle is an outlet-pipe O, through which the heated water may pass to any desired location.

A check-valve H is located in the inlet-pipe, outside of the first receptacle, which serves to prevent the backflow of the water that enters the receptacles. That portion of the inlet-pipe which extends within the receptacle is provided with a series of perforations K K, while the inner end of the pipe is plugged up or closed, thus causing the supply of water to be forced through the perforations and evenly distributed into the receptacle in a downward direction.

Arranged about one wall of the casing is a series of reflectors M of any desired size or shape, which are inclined at an angle, said reflectors being preferably disposed upon the arc of a circle and serve to cause the rays of the sun to be reflected at different hours of the day upon the receptacles containing the water to be heated. The cover N, which is of glass, may be held to the casing in any suitable manner.

From the foregoing description it will be noted that the heat-retaining material nearly surrounds the first cylindrical receptacle, which is for the purpose of allowing the heat contained therein to partly warm the said receptacle, which is less exposed to the reflected rays than is the inner receptacle.

In order to assist in retaining the heat within the receptacles, it is my purpose to surround the case containing the water-receptacles with an outer casing A', between which and the inner casing, on the sides and bottom, is a slight space, as shown in the drawings, and when the heating apparatus is equipped for use it is my purpose to incline the casing at an angle and to make the necessary connections with storage-receptacles.

Having thus described my invention, what I claim to be new, and desire to secure by Letters Patent, is—

A solar heater, comprising in combination with the double-walled box mounted at an inclination, of a heat-retaining material therein, the water-receptacles supported by and partly embedded in said heat-retaining material, suitable connections between said receptacles, the inclined reflectors in said box, and the double glass cover, with space intervening between same, as shown and described.

In testimony whereof I affix my signature in presence of two witnesses.

CHARLES A. DAVIS.

Witnesses:
JOHN McDONALD,
ANN E. STARR.